United States Patent [19]
Durhman

[11] Patent Number: 5,916,509
[45] Date of Patent: Jun. 29, 1999

[54] ACTINIC IRRADIATION AND CURING OF PLASTIC COMPOSITES WITHIN A MATERIAL FORMING DIE

[76] Inventor: Paul P. Durhman, 200 Cameron Ave., La Crosse, Wis. 54601

[21] Appl. No.: 08/937,702

[22] Filed: Sep. 25, 1997

Related U.S. Application Data

[60] Provisional application No. 60/037,863, Feb. 7, 1997.

[51] Int. Cl.⁶ .......................... B29C 35/10; B29C 70/52
[52] U.S. Cl. ................ 264/477; 264/137; 264/171.24; 264/495; 264/496
[58] Field of Search .................. 264/137, 171.24, 264/477, 495, 496

[56] References Cited

U.S. PATENT DOCUMENTS

| | | | |
|---|---|---|---|
| 4,515,737 | 5/1985 | Karino et al. | 264/477 |
| 4,861,621 | 8/1989 | Kanzaki | 427/515 |
| 4,883,550 | 11/1989 | Overath et al. | 156/171 |
| 4,892,764 | 1/1990 | Drain et al. | 428/34.5 |
| 5,114,633 | 5/1992 | Stewart | 264/444 |
| 5,700,417 | 12/1997 | Fernyhough et al. | 264/477 |

FOREIGN PATENT DOCUMENTS

| | | | |
|---|---|---|---|
| 61-10440 | 1/1986 | Japan | 264/495 |
| 62-174134 | 7/1987 | Japan | 264/495 |
| 1 546 764 | 5/1979 | United Kingdom | 264/496 |

OTHER PUBLICATIONS

Chiang, Wen–Yen and Chan, Saho–Ching, Preparation and Properties of UV–Autocurable BTDA–Based Epoxy–Multiacrylate Resins. Effects of the Degree of Polymerization and the Epoxy Type, Journal of Applied Polymer Science, vol. 43 1827–1836 (1991).

Hiraishi, S.; Karino, S.; Ishida, Y., A New Continuous Molding Process for Thermoset RP/Thermoplastic Structural Composites—EPF Process, Society of the Plastics Industry, pp. 1–5, 1982.

Kennedy, Kenneth and Kusy, Robert, UV–Cured Pultrusion Processing of Glass–Reinforced Polymer Composites, Journal of Vinyl & Additive Technology, vol. 1, No. 2, pp. 182–186, Sep. 1995.

*Primary Examiner*—Leo B. Tentoni
*Attorney, Agent, or Firm*—M. Paul Hendrickson

[57] ABSTRACT

Uncured thermoset composite reactants containing ultraviolet curable reagents may be effectively cured by pultrusion using a unique molding die which uniformly irradiates the uncured composites contained within the die. The die includes strategically positioned passageways communicating through the chamber walls of the die to the die chamber. The passageways are equipped with fiber optic cables connected to an ultraviolet generator at one cable end and ultraviolet discharging end for discharging ultraviolet radiation within the die chamber at an opposite cable end. Ultraviolet light conducted to the die chamber by the fiber optic cables uniformly initiates and catalyzes the uncured reactants to produce a fully cured thermoset composite. Uncured composite reactants may be continuously fed to the die as the cured composites are continuously withdrawn from the die.

14 Claims, 3 Drawing Sheets

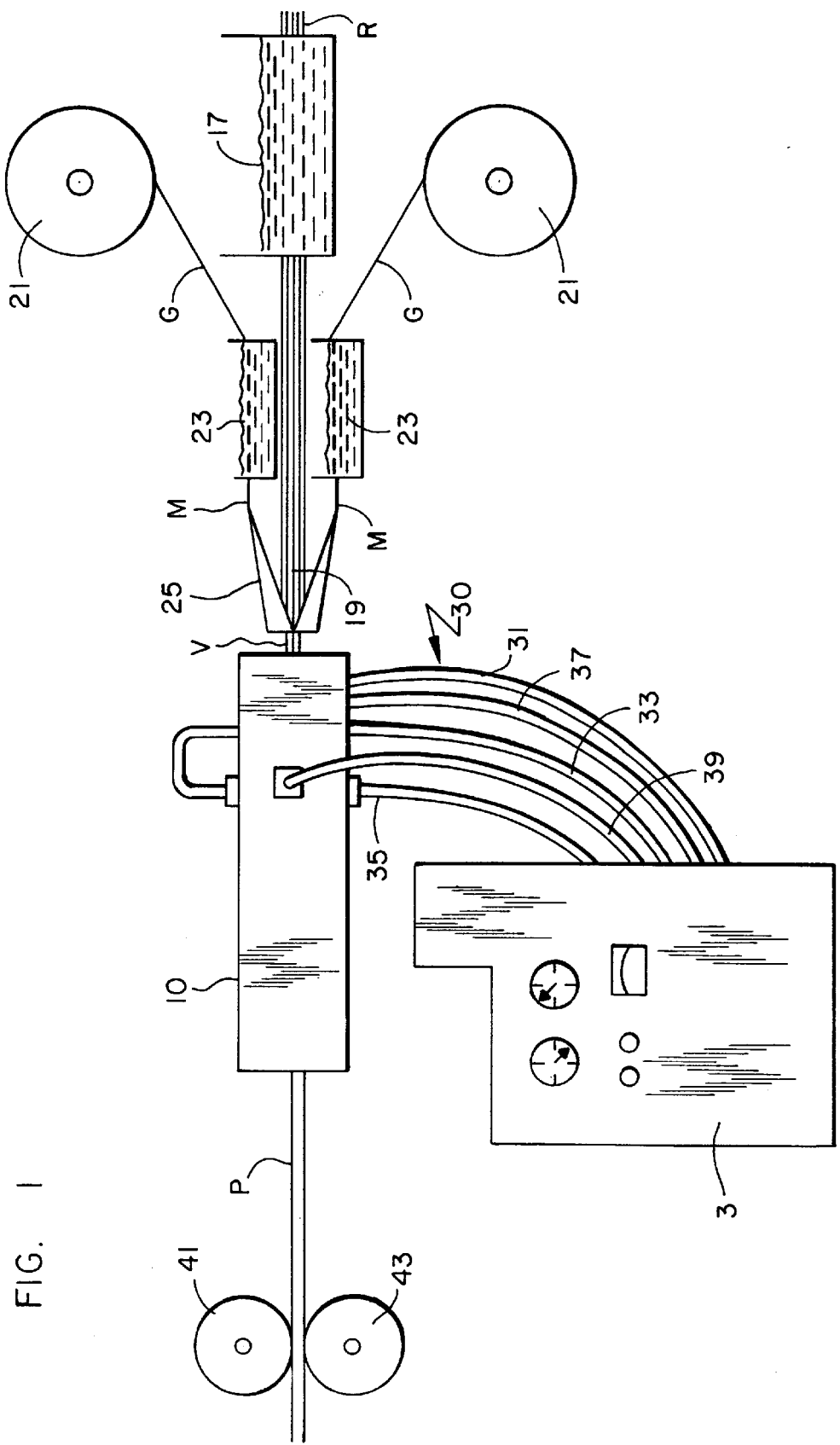

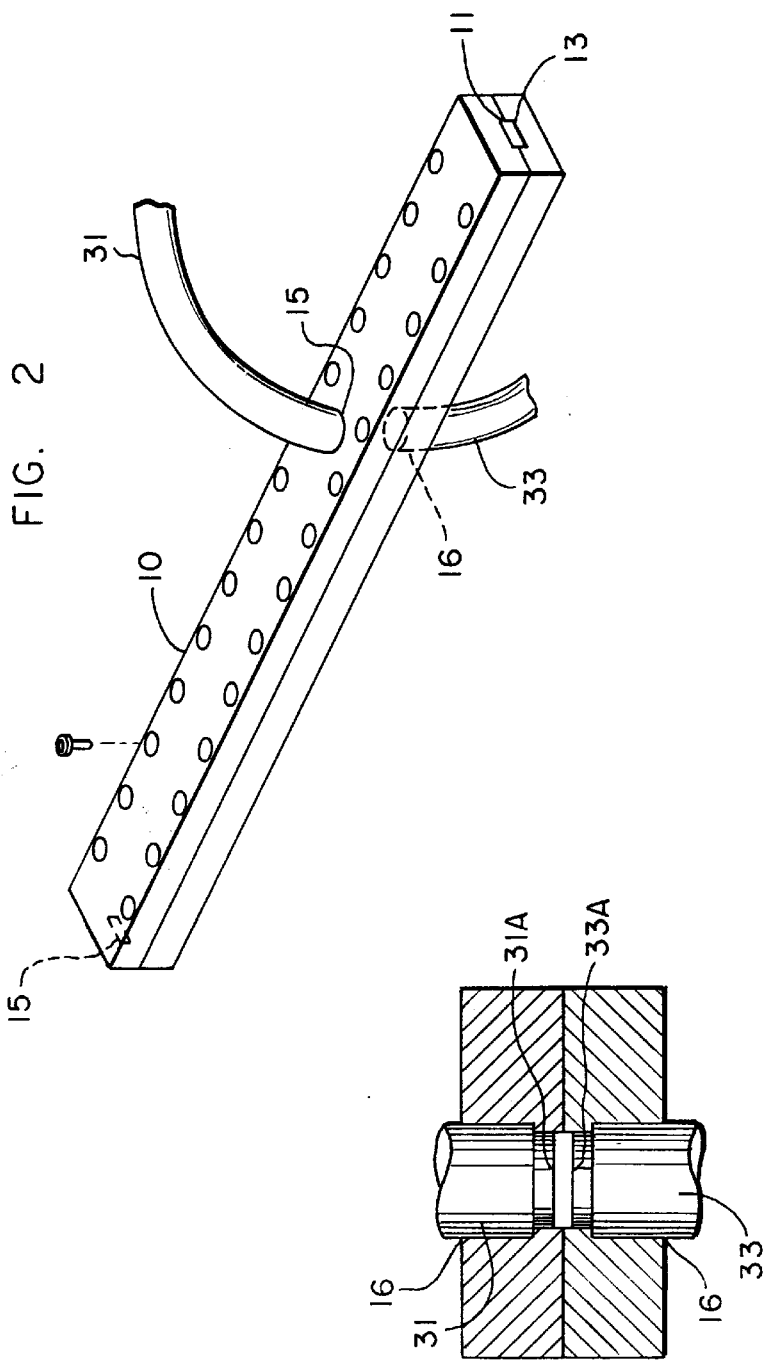
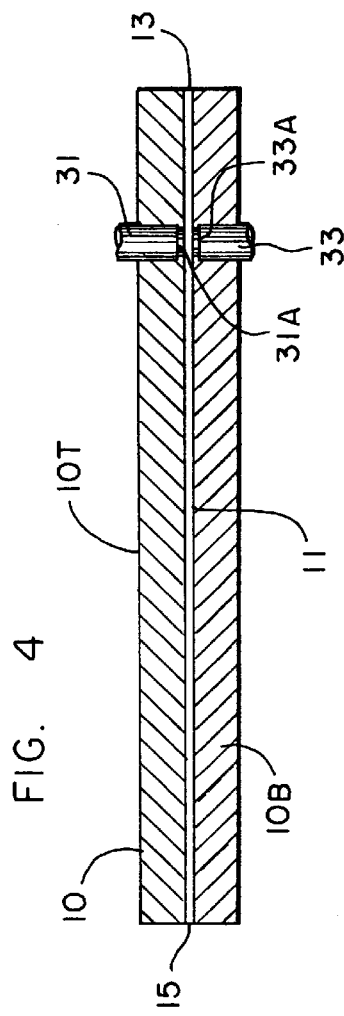

ACTINIC IRRADIATION AND CURING OF PLASTIC COMPOSITES WITHIN A MATERIAL FORMING DIE

This patent application claims the benefit of provisional patent application Ser. No. 60/037,863 which was filed on Feb. 7, 1997.

FIELD OF THE INVENTION

The present invention pertains to the manufacture of plastic components and equipment therefore and more particularly involves the use of actinic radiation such as ultraviolet light to initiate curing of curable reactants within a material forming die.

BACKGROUND OF THE INVENTION

It is known to fabricate fiber-reinforced plastic composites (FRP) possessing superior structural strength from strands or tows of reinforcing fibers such as fiber glass enshrouded within a plastic matrix, particularly of cured thermoset resins fabricated under super-atmospheric conditions within a material forming die. Reacting the thermoset reactants and working the FRP within the confines of the die at semi-solid extruding conditions creates compressive forming pressures which yields an extremely compact and dense product. The FRP products are useful for numerous applications where structural strength and durability are required and the more expensive, less durable or scarcer fabricating materials may be effectively replaced with FRP.

These FRP products are typically manufactured by a manufacturing process referred to as pultrusion. The term "pultrusion" is generally used to mean the art for manufacturing fiber reinforced plastics wherein a continuous reinforcing material, most commonly, a filamentary material, is first impregnated with a curable or polymerizable liquid resin and pulled through a die having a desired cross section to shape the impregnated resinous material while polymerizing or curing the reactants into a cured product. The cured product of a continuous length and uniform cross sectional size is pulled from the discharging orifice and cut into pieces of the desired length. The most prevalent curing practice involves simply heating the heat initiated curable reactants to a reaction temperature sufficient to initiate the reactants to undergo chemical reaction and cure into a thermoset or cross-linked resin. Pursuant to this common practice, thermosetting reactants impregnated upon reinforcing strands or tows are continuously fed through a material forming die maintained at a thermally reactive temperature sufficient to cause heated thermosetting reactants to react within the heated die and thereby permit the reactants to cure into a fiber reinforced thermoset resin product.

Pultrusion is particularly useful in the manufacture of FRP composites of a relatively large bulk or dimensional size. The compacting and pressurized processing conditions yield a densely weighted product. Pultrusion is commonly used in the manufacture of bulky fiber reinforced thermoset impregnated materials such as in the fabrication of high-strength materials such as pipes, rods, tubes, levers, handles, construction beams, window and door jams, gates, frames, etc.

It is known that thermosetting resins containing ultraviolet curable reagents may be cured by exposing the resins to ultraviolet light. The ultraviolet light catalyzes ultraviolet sensitive initiating precursors causing the reactants to cure into a thermoset resin. In order for the reactants to uniformly cure into a thermoset resin, the ultraviolet light must necessarily uniformly penetrate the reactants to trigger the catalysis of the reaction system. Although ultraviolet light may be effectively utilized to catalyze thermoset products of a relatively small dimensional size, UV light cannot effectively penetrate into the reaction media such as contained within the forming die as typically used to form bulky materials by pultrusion. Attempts to utilize UV light to cure such bulky materials generally results in topographical or surface curing of the reactants. This provides a defective product possessing a superficial cured thermoset skin leaving the internally disposed reactants uncured. Initiation and curing, in essence, is accordingly limited by the superficial penetration of the UV light within a peripheral margin of thin-skinned layer of reactants under conventional UV curing techniques.

Although there have been attempts to cure UV curable resins with UV light in a pultrusion, the irradiation of the curable resins have been conducted in an open environment in which the UV curable resin is exposed to UV light source. Curing under an open environmental conditions fails to produce the desirable compact and denser product as produced within the closed confines of a material forming die via pultrusion. Attempts have also been made to use transparent dies constructed of materials capable of withstanding the elevated thermal conditions needed to initiate the curing reaction. Material forming dies constructed of glass have been proposed for this purpose. Unfortunately, glass dies only allow the interfacing superficial margin of UV curable resin to become initiated and cured by UV light leaving the internal portions uncured. Glass dies also do not possess sufficient strength and durability as provided by metal dies in pultrusion. Moreover, uncured resins characteristically possess a high degree of tack with a tendency to stick onto the inner surface of the material forming die which, in turn, leads to fouling and plugging of the die. This results in destruction of the die forming efficacy as well as the production of an uncured and defective FRP.

Curable resins which, under actinic radiation conditions, cure into a solid cured reaction product have been extensively reported and commercially available from a variety of commercial sources. The following literature which discloses various different actinic ray curable resinous reactants which, upon actinic radiation, will cure into a thermoset resin are incorporated into and made a part of the enabling embodiment of this application. Exemplary of such actinic curable resins include the acrylic and methacrylic acids, amides and esters as disclosed in U.S. Pat. No. 4,892,764 (e.g. see Col. 6, line 53 through Col. 7, line 15) and U.S. Pat. Nos. 4,051,195; 2,895,950; 3,218,305; and 3,425,988; the actinic curable vinyl monomers such as styrene vinyl toluene, vinyl pyrrolidone, vinyl acetate, divinyl benzene and the like; the actinic radiation curable unsaturated polyesters solubilized in vinyl monomers, as ordinarily prepared from alpha-beta ethylenically unsaturated polycarboxylic acids and polyhydric alcohols such as described for example in U.S. Pat. No. 4,025,407; the UV curable epoxy resins, including the cycloaliphatic epoxies, the diglycidyl ether of resorcinal (WC69), the diglycidyl ether of bisphonel-A (EP828), the diglycidyl ether of cyclohexane dimethonal (MK107) the limonene dioxide, the limonene oxide, alpha pinene oxide, aliphatic epoxides such as butyl diglycidyl ether, the diglycidyl ether of 1,4 butanediol (WC67), neopentyl glycol diglycidyl ether, diglycidyl ether of neopentyl glycol (WC68) as illustratively disclosed in U.S. Pat. No. 4,412,048.

"Actinic radiation" is generic to ultraviolet light and generally refers to electromagnetic radiation having a wavelength of about 700 nm or less which is capable, directly or indirectly, of curing the specified resin component or the resin composition. Photoinitiators conventionally added to actinic radiation curable resins in an amount effective to respond to the actinic radiation and to initiate or to induce curing of the curable resin may be incorporated at initiating levels into the curable resins. Representative known photoinitiators useful with ultraviolet (UV) actinic radiation in the curing of (meth)acrylic and vinyl monomers include free radical generating UV initiators such as benzophenone, diethoxy-acetophenone, benzoin methyl ether, benzoin ethyl ether, benxion isopropyl ether, diethoxyxanthone, chlorothio-xanthone, azo-bis-isobutyronitrile, N-methyl diethanol-amine-benzophenone and mixtures thereof. Known visible light initiators include camphoroquinone-peroxyester initiators and 9-fluorene carboxylic acid peroxyesters. Art-recognized infrared initiators include cumeme hydroperoxide, benzoyl peroxide, asobisisobutyronitrile, and like azo and peroxide compounds.

When actinic radiation is applied to an epoxy resin, photoinitiators which, when exposed to UV light, liberate a Lewis acid and/or Bronsted acid, such as iodonium salts, sulfonium salts, arsonium salts and diazonium salts may be used to initiate the epoxide reaction. The required photoinitiator level for initiating any given reaction is known and may be readily determined by conventional techniques. In general, when (meth)acrylic and vinyl resin components are used, the photoinitiator concentration will typically range from about 0.1–10 percent by weight of the total weight of the resin component. For the UV curable epoxies, the Lewis acid/Bronsted acid-releasing initiator will typically be present at a concentration of about 1–5 percent by weight, based on the weight of the epoxy resin.

Auto-curable multi-acrytate resin which, when exposed to ultraviolet irradiation, will cure into a thermoset resin without requiring conventional photoinitiators are also known. An article by Wen-Yen Chaing et al. entitled "UV-Autocurable Epoxy-Multiacrytate Resins" (*Journal of Applied Polymer Science*, Vol. 43, Pages 1827–1836, 1991) reports the syntheses of various UV autocurable epoxy-multiacrylate resins by reacting various diglycidyl ethers of 1,4-butanediol, neopentyl glycol, resorcinal, cyclohexane dimethanol and bisphenol-A with acrylic oligomers and monomers such as 1,2-hydroxyethyl acrytate and 3,3', 4,4'-benzophenone tetracarboxylic, dianhydride to provide built-in photoinitiating systems. U.S. Pat. No. 4,004,998 by G. Rusen, U.S. Pat. No. 4,514,527 by R. L. Bowen, U.S. Pat. No. 4,158,618 by S. D. Pastor and polyurethane and polyesters multiacrylate oligomers (e.g. see Chiang et al., *Journal of Applied Science*, Vol. 37, Page 1669, 1989 and Vol. 41, Page 2971, 1990; Angew Makromol, Chemistry, Vol. 179, Page 57, 1990) also disclose UV curable resins which cure without requiring added photoinitiator. The autocurable resins were developed to overcome the need to load the resin with large amounts of photoinitiators which often failed to homogeneously mix and remain chemically unbounded within the cured resin.

In the pultrusion process, the curable resin comments are typically formulated with volatile constituents which, when exposed to the elevated reaction conditions, will volatilize. Such volatilized constituents can form pin holes, pockets, channels, voids, etc. throughout the product which renders the product less appealing as well lead to defects or substantial weakening to the FRP structure. The range of useful reactants and additives can also be limited by the compatibility of the particular reactants and additives to the relatively high temperatures and heat needed to drive the chemical reaction to completion or cure the thermoset resin.

The elevated thermal reaction conditions can also give rise to fluid movement of certain components within the uncured resin which, in turn, may adversely affect the uniformity of the cured product. In addition to the cured reaction by-products, other conventional additives such as coloring additives (e.g. dyes, pigments), stabilizers, antioxidants, fillers, surfactants, tackifiers, promoters, solvent carriers, and dispensers, etc. are limited in adaptability and can create residual problems due to harshness of the thermal reaction conditions created by the heated die.

It would be particularly advantageous to alleviate the problems associated with the use of heated conditions to cure bulky materials formed by the pultrusion technique by using actinic radiation such as ultraviolet light to catalyze the reactants within a material forming die to a cured thermoset product. The ability to create FRP pultrusion products under ambient die conditions would substantially alleviate those problems associated through the use of heated dies in the pultrusion of FRP products. Significant benefits would arise if it were possible to uniformly initiate curing of FRP composites with a material forming die using ultraviolet light to initiate curing under processing conditions so as to impart substantially uniform curing to the FRP.

SUMMARY OF THE INVENTION

The present invention provides an effective method for curing uncured reactants to a thermoset resin using a material forming die as a reaction chamber and actinic radiation to initiate the curing reaction within the reaction chamber of the die. The method relies upon a unique die equipped with conducting means to uniformly conduct and distribute concentrated actinic radiation (e.g. ultraviolet) within the reaction chamber of the die. The unique means for conducting the actinic radiation under the confined pressurized conditions of the material forming die permits uniform catalysis and initiation of uncured reactants within the reaction media so as to more uniformly and completely cure the thermosetting reactants. This allows the manufacturer to fully cure the reactants by exposure to actinic radiation under pressure so as to produce a dense and large-sized FRP.

The method involves extruding thermoset resins by pultrusion using actinic radiation such as ultraviolet light to catalyze thermosetting reactants containing actinic radiation curable reagents while the reactants are confined under pressure within a molding die equipped with a reactant feed inlet for admitting reactants to the die, actinic radiation or ultraviolet conducting means for conducting and uniformly distributing the radiation to the reactants housed within a chamber of the die and a discharging orifice for discharging catalyzed reactants from the die. The method generally entails:

a) continuously feeding the thermosetting reactants to the die;

b) transmitting the actinic radiation by the conducting means to the reactants at an irradiation site confined within the chamber of the die;

c) catalyzing and curing said reactants to a cured thermoset resin by catalyzing the curable reagents with said actinic radiation at the site while confining and conveying the reactants within said die; and d) pulling the cured thermoset resin through said discharging orifice and from the die.

The method may be effectively applied to the manufacture of FRP composites fabricated from tows of reinforcing fibers such as fiber glass enshrouded within a matrix of cured thermoset resin. The thermosetting resins which, upon exposure to actinic radiation such as UV light, are catalyzed to cure into a thermoset resin are known and include those mentioned before in the background of the invention. The composites may be formed by impregnating continuous strands of fiberglass with a UV curable liquid resin and passing the impregnated strands through a confined reaction zone of a die chamber equipped with UV conducting means for uniformly distributing ultraviolet light radiation within the reaction zone. The ultraviolet light activates the curing of resins such as a photoinitiator contained within the curable resin to liberate activating initiators for initiating the chemical reactivity between the resinous reactants. The conducting means concentrates the ultraviolet radiation and conducts the radiation directly onto the interfacing surface of the reactants. Uniform internal penetration of the UV light within the UV curable resin while the curable resin is maintained within the confines of the material forming die effectuates a substantially uniform curing of the reactants into a thermoset resin. The UV activated resin, while still in a pliable and drawable condition, may then be drawn through a material-forming orifice to form the drawn, uniformly cured resin of a desired configuration. The drawn and cured thermoset resin is continuously discharged from the die and may be appropriately cut to a desired product length.

Pursuant to the present invention, uniform distribution of UV light within the reaction media necessitates that the UV light be transmitted by a UV conducting means to a UV emitting or irradiation site positioned within the interior of material forming die itself as opposed to use of glass dies in which the UV light simply passes without transmission through the transparent die to the interfacing surface of the reaction media. The UV conducting means utilized herein are most appropriately of the type capable of conducting light through a curved path along an optic conducting means to UV discharging site within the die. Such UV conducting means characteristically have an ability to preferentially conduct UV light along a curved path of the UV conducting means. Thus, in the case of a light conducting solid mass of a bent or curved structure, UV light inputs from a suitable light source will preferably follow along the bent or curved structure of the light conducting means to an internal site located within the confines of the die itself. Internally conducting the ultraviolet light to the reactant interface by the conducting means intensifies the irradiation at the irradiation site allowing for greater penetration and more uniform irradiation and curing of the reactants.

BRIEF DESCRIPTION OF THE DRAWINGS

FIG. 1 is a schematic representation depicting the use of UV light in the manufacture of fiber reinforced plastic products by a pultrusion process.

FIG. 2 depicts a perspective view of a material-forming die equipped with fiber optic cables for transmitting ultraviolet light into the reaction chamber of the die.

FIG. 3 is a cross-sectional view of material forming die equipped with light emitting fiber-optic cables taken along line 3—3 of FIG. 2.

FIG. 4 is a cross-sectional view taken along line 4—4 of FIG. 2.

DETAILED DESCRIPTION OF THE INVENTION

Figure 5:
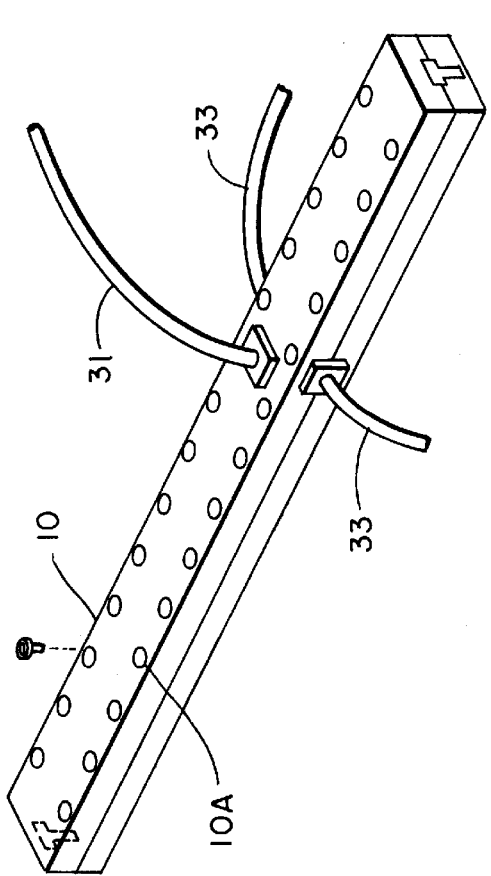
FIG. 5 depicts another perspective view of a different material forming die equipped with light emitting cables.

The present invention provides a method for using concentrated actinic radiation generated by a UV source (designated as 3) to catalyze curable reactants containing actinic radiation curable reagents or reactants (represented as V) while confined within a material forming chamber 11 of a molding die 10 equipped with a reactant inlet 13 for feeding reactants V to die 10, actinic radiation means (generally designated as a 30 series enumeration) for the radiating onto an interfacing surface of reactants V by conducting and uniformly irradiating the reactants V within the chamber 11 at the interfacing surface and a discharging orifice 15 for discharging irradiated and cured reactants P from die 10, said method comprising:

a) feeding the curable reactants V to chamber 11 of die 10;
b) irradiating the reactants V within the chamber 11 by conducting said actinic radiation to the interfacing surface of reactants V;
c) initiating the curing of said reactants V with said actinic radiation while confining the reactants V within said chamber 11; and
d) drawing the irradiated reactants P through said discharging orifice 15 and from the die 10 with drawing means 41 and 43 for withdrawing said reactants P therefrom.

Referring in particular to the Figures, FIG. 1 schematically illustrates the overall procedure for manufacturing FRP (P) using actinic irradiation (e.g. ultraviolet light) conducted within a material forming die 10 to cure a UV curable mass V to a cured thermoset composite product P. In the manufacture, glass rovings composed of continuous liner fibers (designated as R) may be suitably impregnated with a UV curable resin by continuously drawing the glass rovings R through resin bath 17 and roving feeds 19. Meanwhile, matted glass fiber G is continuously unwound from glass mat rollers 21 and fed through resin baths 23 for impregnating the matted glass fiber G with curable resin and onto a mat forming shield 25 which combines resin impregnated glass roving R with the impregnated mat M to form an uncured resin composite V which is continuously fed into feed inlet 13 of material forming die 10 equipped with a material forming chamber 11. Although not necessary, an external jacket (not shown) continuously cooled or heated with a fluid coolant through cooling or heating inletting conduits and discharging conduits passing through a heat exchanger (not shown) for cooling or heating die 10 may be utilized if desired. In the preferred embodiments of the invention, the uncured reactants V are initiated to curing by ultraviolet light without requiring any heating or cooling to facilitate the reaction of the reaction media within reaction chamber 11.

The method entails conducting a concentrated source of actinic irradiation directly to the interfacing surface of the reactants V while retaining the irradiated reactants V within the closed confines of the reaction chamber 11. Ultraviolet light (UV) generated by concentrated UV light source 3 is the preferred actinic irradiation means. The actinic irradiation means, such as UV irradiation means, may utilize several fiber optic cables (generally designated by a 30 series number) strategically positioned at the interfacing surface within die chamber 11 of die 10 so as to directly contact upon the reactants V, uniformly distribute and initiate the catalysis of the UV curing reaction of the uncured resin composite V. As may be further observed from the cross-sectional views of FIGS. 3–6, the discharging or terminating ends (30 series numbers suffixed by an A) of optic cables (31, 33, 35, 37 and 39) are designed to emit concentrated UV light from terminating ends 31A, 33A, 35A, 37A and 39A across a sufficient cross-sectional segment of the uncured resin composite V surface so as to uniformly penetrate or irradiate the curable mass with UV light and thereby initiate curing of the resin composite V to provide a substantially uniformly cured reaction product P. As may be observed from the cross-sectional views, the terminating ends 31A, 33A, 35A, 37A and 39A are depicted as resting flushly with the internal surface of barrel of chamber 11 so as to make direct contact with the curable resin V. The irradiation of the uncured resin composite V occurs while resin is maintained under pressure within the confines of chamber 11.

The number of fiber optic cables needed to effectuate curing of the uncured mass V to a substantially uniformly cured reaction product P depends primarily upon the cross-sectional mass of the uncured mass V. The larger the mass, the greater the number of UV discharging sites which are needed to effectively initiate the UV catalysis or the photo-initiator system. The number of required optic cables 30 and strategic placement within the chamber 11 dimensionally depend upon the cross-sectional and surface area of uncured resin flowing through die 10. In general, the larger the mass in cross-sectional size, the greater the number of fiber optic cables 30 which will be needed to effectuate complete curing of the resin. When the depth of the mass is more than $\frac{1}{8}$ of an inch removed from the interfacing surface of the die, positioning of the fiber optics 30 internally within the mass as opposed to flushly with the interfacing surface of die chamber 11 may be utilized to effectuate deeper curing. It will be observed that FIGS. 5 and 6 illustrate the use of five optic cables (31, 33, 35, 37 and 39) positioned to service a bulky composite V while FIGS. 2–4 depict a die 10 wherein only two fiber optic cables 31 and 33 are needed to effectively irradiate an uncured, rectangular mass of a cross-sectional area measuring 0.750 inches by 0.125 inches.

Fiber optic cables 30 are utilized to effectively transmit concentrated UV light generated by source 3 to within the internal confines of die chamber 11. As may be further observed from the cross-sectional view of chamber 11 in FIGS. 5–7, terminal ends 31A, 33A, 35A, 37A and 39A of optic fiber cables 31, 33, 35, 37, and 39 are strategically positioned within chamber 11 so as to permit more uniform penetration and complete exposure of the entire reactant mass V to the UV light. Positioning of the terminal ends 31A, 33A, 35A, 37A and 39A is designed so as to uniformly activate the initiator system for the curing of composite V. The number of optic fiber cables 30 and placement thereof needed to effectively initiate the reaction depends upon the volumetric mass of reactants V flowing through chamber 11 and the irradiating surface area collectively served by cable ends 30. Efficacy of the UV irradiation may be determined by cross-sectionally examining the discharged resin P for any uncured resinous material. Uncured resinous material is generally indicative that a tighter placement pattern and additional irradiation sites may be needed in order to more completely irradiate and cure the uncured mass V. In general, reaction masses of a larger cross-dimensional size will require a higher number of fiber optic cables 30 in order to more thoroughly cure the mass into the desired cured FRP product. Typically, the UV light emitted or irradiated by the fiber optic cables 30 as generated by medium pressure mercury lamp penetrates and initiates curing of uncured product V to a penetration depth measuring up to about $\frac{1}{16}$ inch in depth. Under such irradiation conditions, the terminating ends 31A, 33A, 35A, 37A and 39A when paired in a laterally opposing relationship will typically effectively irradiate the reactants V directly at the interfacing onto the surface of the ends 31A, 33A, 35A, 37A and 39A plus an activating penetration of about $\frac{1}{8}$ inch. Thus, when a fiber optic cable 30 equipped with a terminal optic end measuring $\frac{1}{2}$ inch diameter is used to irradiate the uncured mass V, the cable end will typically irradiate an area measuring $\frac{1}{2}$ inch plus an additional $\frac{1}{8}$ peripheral penetration margin when paired for total surface coverage of $\frac{3}{4}$ inch and a penetrating depth of $\frac{1}{8}$ inch penetrating into the reaction mass V. FIGS. 2—4 depict centrally placing one optic fiber end 31A flushly at the interface and center of the chamber wall 11 of top plate 10T while another optic fiber end 33A is positioned upon the lower chamber wall interface of bottom plate 10B to provide substantially complete and uniform penetration of UV light into a rectangular-shaped uncured mass V measuring 0.125 inches by 0.750 inches. Fiber optic cable ports 15 and 16 of top plate 10T and bottom plate 10B provide passageway for optic fibers 31 and 33 to chamber 11. The top plate 10T and bottom plate 10B may be appropriately secured together by a series of head bolts 10H (one shown), the heads of which are receedly seated in head bolt apertures 10P and matingly threaded onto bottom plate 10B.

Figure 6:
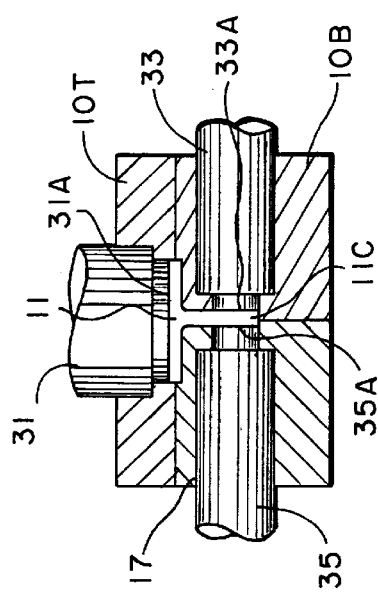
FIG. 6 is a cross-sectional view taken along line 6—6 of FIG. 5.
Figure 7:
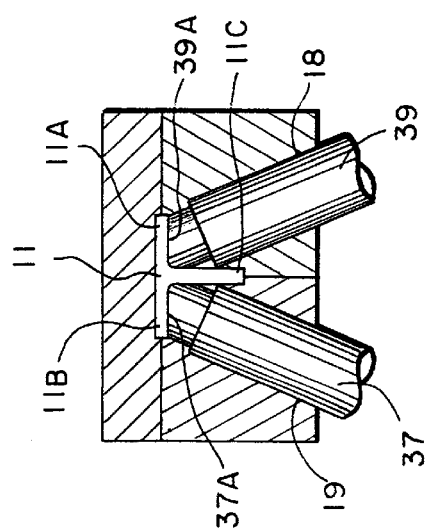
FIG. 7 is a cross-sectional view taken along line 7—7 of FIG. 5.

FIGS. 5–7 illustratively depicts a material-forming die 10 equipped with five fiber optic cable ports (15A, 16A, 17, 18 and 19) to which fiber optic cables 31, 33, 35, 37 and 39 are anchored within and respectively wherein the cable ends 31A, 33A, 35A, 37A and 39A are positioned so as to rest flushly in alignment with the longitudinal plane of the internal barrel surface of chamber 11. Die 10 of FIGS. 5–7 is also constructed of an upper plate 10T and a pair of bottom plates 10D and 10E milled so as to provide a T-shaped cross-sectional chamber 11, as depicted in FIGS. 5–7 and adapted to produce a T-shaped cured product P as depicted in FIGS. 5–7. Die 10 of FIGS. 5–7 may be appropriately constructed of three component plates, namely 10T, 10D and 10E from which the die chamber 11 and cable ports 15A, 16A, 17, 18 and 19 may be more easily cut. Similar to die 10 of FIGS. 2–4, the top plate 10T of FIGS. 5–7 may be provided with bolt receiving apertures 10P positioned about the peripheral margin of top plate 10T and mating onto bolt threading (not shown) of bottom plates 10D and 10E for bolting together top plate 10T, bottom plate 10D and bottom plate 10E with head bolts 10H.

The uniformly irradiated resin P is continuously drawn through the irradiating sites (31A, 33A, 35A, 37A, 39A) within chamber 11. The resultant irradiated and cured product P is continuously withdrawn from the discharging section 15 of die 10 by material-pulling means (generally referenced by a 40 series enumeration) comprised of two laterally disposed pneumatic tires or wheels (referred to as pullers 41 and 43) rotationally operated in a common pulling direction so as to pull and draw the cured product P from die 10. The compressive forces exerted by pullers 41 and 43 against cured product P continuously draw the extruded product P from the discharging orifice 15 and continuously feed uncured resin composite V to chamber 11. The drawing means 41 and 43 serve to for continuously draw the roving R and mat M from their respective rolls 21 and through the baths 17 and 23 forming shield 25 and die 10.

The manufacture is particularly well adjusted to produce cured products of multidimensional shapes and configurations. Such multi-dimensional products include products having multiple planar structures of two or more intersecting structural planes or positioned in a transverse relationship to one another. The T-shaped product P produced by die 10 of FIGS. 5–7 depicts multidimensional structures comprised of two major planes, namely the pedestal of the T and the supported cross or top bar of the T representing the other major plane. A cured and planar structure such as represented by FIGS. 2–4 can, with difficulty, be created under an open curing environment whereas the more complex and multiple planer structure of the T-shaped product P of FIGS. 5–7 generally necessitates retention of the uncured mass within a material forming chamber upon initiation and curing of the uncured composite V to a cured product P. By combining material forming and curing within the die chamber 11, it is now possible to produce uniquely different multidimensional products. Other illustrative cured products P of a multi-planar structure include those of three planed configurations such as an I, E, U, N Y, etc., two planer configurations (e.g. L, T, etc.), four planar configurations, (e.g. M, W, etc.) and other multi-planed tubular structures (e.g. square, trapezoidal, triangular, hexagonal, polynomial shapes, etc.) with open centers may be adapted to the present manufacture by creating a die of an appropriate configuration and the appropriate placement of the terminal ends of the fiber optic cable 30 within the die. Similarly, die 10 of a curvilinear configuration with the proper placement of terminating ends of cables 30 may be utilized to produce a variety of rods, pipes, arches, pinwheels, spoked articles and numerous other tubular circular-shaped articles using the internal die radiation manufacturing technique of this invention. Irradiating the uncured mass V while maintaining the mass confined within die 10 allows the mass to structurally cure to the desired multi-planar configuration while the mass resides within the material forming die 10. The present manufacture allows the uncured mass to structurally cure into the desired configuration at a temperature of less than 100° C. while retained within the confinement of die 10.

The catalysis or photoinitiating of the uncured reactants by the actinic radiation results in an exothermic reaction which generates exothermic heat. The ability to conduct the exothermic reaction within the confines of the die at a relatively low processing temperature constitutes a major advantage of the present manufacture over the high temperature curing processes. Unlike conventional curing of thermoset composites which often rely upon heating of the uncured reactants to temperatures of 280° F.–320° F. or higher to initially initiate or activate the initiator system which is then followed by exothermic reaction generating temperatures which may heat the cured product drawn form the discharging orifice to temperatures in excess of 400° F., the UV curing within die 10 permits the forming and curing to be conducted at significantly lower processing temperatures. The manufacture may be typically conducted at temperatures of less than 100° C. and advantageously at a product discharging temperature of less than 90° C. Photoinitiation or UV irradiation of the photoinitiators will typically trigger the generation of exothermic heat within the reaction mass so that the temperature of the material typically exiting from die 10 will have a temperature illustratively ranging from about 60° C. to about 85° C. in contrast to conventional curing conditions which customarily yields in a product of 200° C. or higher issuing from the die.

The manner wherein the UV radiation is irradiated directly onto the reaction mass V within the closed confines of the die 10 provides uniform initiation and curing of the reactants V. By positioning two or more terminal ends of fiber optic cables 30 at a laterally opposing relationship and typically positioned less than about 0.25 inches apart and spaced within die 10 in an interfacial relationship so as to irradiate substantially all of the surface area of the uncured reactants passing through die 10 as shown by FIGS. 2–7, a more uniform irradiation, initiation and curing of the reactants V is thereby effectuated.

For reasons mentioned above, it is desirable to conduct the exothermic reaction so that the cured product issuing from die 10 is maintained at a temperature of less than 100° C. Accordingly, photoinitiators which are activated by UV irradiation at temperatures of less than 100° C., advantageously less than 80° C. and preferably at less than 60° C., and most preferably less than 30° C. are used herein. Accordingly, it is desirable to utilize a commercially available and curable reactant system which, when exposed to UV light, will undergo an exothermic reaction but yield a cured product P exiting from die 10 at a temperature of less than 100° C. If necessary, die 10 may be cooled so as to cool the exothermic mass to a temperature of less than 100° C. Photoinitiators which, when exposed to UV light at the aforementioned reduced thermal operating conditions, may be effectively applied to the manufacture. These initiators and their initiating temperatures are known.

The depth of the UV activation within uncured product may be increased to deeper penetration by incorporating a conventional photoinitiator system which, upon initiation of the curing reaction with the UV light and the ensuing exothermic reaction, triggers the catalysis of a curing initiators formulated into the uncured composite V and situated beneath the UV penetration depth. The initiation generally involves a two step catalysis of the reaction media in which the irradiation initiates the exothermic reaction which, in turn, supplies the necessary heat of activation for initiating of the thermal initiator component within the reaction mass. For example, heat activated catalysts, such as the peroxies, may be incorporated into the uncured resin. The two tier initiation system reduces the total amount of heat generated by the exothermic reaction while also permitting a deeper penetration into the sub-surface of the reaction mass. For this purpose, cross-linking initiators which initiating system catalyzes the cross-linking reaction when exposed to exothermic generated temperatures of about 40° C. to about 100° C. and preferably from about 50° C. to about 85° C., may be incorporated into the uncured resin.

As may be observed from the figures, a major surface area of the uncured composite V may be interfacially irradiated with the ultraviolet within the die 10 to initiate and effectuate curing thereof to the desired thermoset product P. It is advantageous to expose at least 75% and preferably at least 90% of the surface area of the uncured composite interfacing onto the chamber 11 surface to initiate the curing with the ultraviolet irradiation. The dies depicted by the FIGS. 2–7 are designed to expose substantially all (e.g. more than 98%) of the surface of the uncured composite V interfacing at the irradiating site onto the internal barrel surface to irradiation with ultraviolet light so that substantially all of the uncured product surface plus the penetration depth is exposed and activated by the ultraviolet light. This permits the uncured product V to uniformly cure to the desired cured product P.

The present process may also be adapted to the manufacture of cured products in which the uncured product V is passed through the die to be irradiated and cured to a cured product P and thereafter the resultant cured product P re-coated or re-layered with uncured composite V applied to the surface of the cured product P and then passed through the die wherein the uncured layer or coating is subjected to irradiation so as to initiate and effectuate curing of the overcast layer or coating. This procedure may be sequentially repeated until the desired thickness is achieved and the process may be conducted continuously in a manner such that the product obtained from die 10 is immediately coated or layered with composite product, passed through an irradiating die and cured with layered or cured coated product then being coated or layered with fresh uncured composite, passed through a die, irradiated therein and cured thereby with the sequential processing thereof being sequentially repeated until the desired thickness of the cured product P is ultimately achieved. This procedure may be effectively utilized in the manufacture of pipes, wherein the initial cured pipe is repeatedly coated and irradiated with additional layers of uncured resin until the desired pipe core thickness is achieved. Similarly, the coating or layers may be physically or chemically varied so as to achieve a desired physical or chemical property. Adherence is also enhanced by the elevated temperature of the material issuing from the die. If desired, the cured material P issuing from the die 10 may be colored by a pigmented coating to provide the desired pigmented or painted product. Excessive pigments can interefere with the transmission and penetration of light within the uncured mass.

EXAMPLE 1

A continuous cured solid bar P of a rectangular cross-sectional shape measuring 0.125"×0.750" was prepared by the pultrusion technique, as depicted by FIG. 1, using a UV curable resin uniformly exposed to UV irradiation within a material forming die 10 as depicted in FIGS. 2–4. The manufacturing equipment used to irradiate the uncured composite V included a UV source 3 comprised of a medium pressure mercury lamp (manufactured by Sylvania and distributed as Part Component No. H2200T4/24Q for a Linde MPHG Unit by Union Carbide Corporation, Linde Division) connected to the Linde MPHG Power Pack and powered by a standard industrial electrical power source. Source 3 was adapted to service up to five flexible fiber optic cables (31, 33, 35, 37, 39) of high transmission glass sheathed in PVC tubing (PVC/Monocoil) measuring 48 inches in length and ½ inch diameter fiber bundle diameter with each terminal end (31A, 33A, 35A, 37A, 39A) being ground, polished and fitted with stainless steel end fittings (fiber optic cables sold under Stock No. C39,370 and distributed by Edmond Scientific Company, 101 East Gloucester Pke, Barrington, N.J. 08007-1380). In this example 1, two fiber optic cables 31 and 33, as illustrated by FIGS. 4 and 5, were utilized to transmit light and photoinitiate the curing within the internal confines and pressurized conditions of die chamber 11. The terminal ends 31A and 33A of cables 31 and 33 rested flushly and in longitudinal alignment along the longitudinal plane of the internal barrel 11 or chamber surface so that material pulled through the die 10 moved smoothly and evenly past the irradiation sites at the terminal ends 31A and 33A. Die 10, as illustrated in FIGS. 2–4 and used in this Example 1, measured 30 inches in length. Die 10 of FIG. 1 had an external rectangular OD dimensional shape measuring 3"×4". Die chamber 11 of the FIG. 1 die 10 was rectangular in shape and cross-sectionally measured 0.125" by 0.750" and extended lengthwise across the entire length of the die 10. The exiting orifice 15 and die feed inlet 13 of die 10 both measured 0.125"×0.750". Uncured resin impregnated fiber and mat V were continuously fed to die chamber 11. The chamber walls 12 and 14 of die 10 were equipped with passageways 15 and 16 for threading fiber optic cables 31 and 33 to internal chamber 11. The terminating ends 31A and 33A of the fiber optic cables 31 and 33 were placed within passageways 15 and 16 at about 10 inches removed from die inlet 13 with one end 31A being resting flushly in planar alignment with the interfacing upper surface of chamber 11 while the other terminating end 33A being positioned in corresponding alignment at the bottom interfacing surface of chamber 11 of bottom plate 10B. The terminating ends 31A and 33A measuring each 0.5 inches in diameter which, in combination with a capacity of the UV light to penetrate the uncured mass V to a depth ranging from about $\frac{1}{16}$" to about $\frac{1}{8}$", provided sufficient penetration and irradiation into the uncured mass so as to effectively irradiate and initiate the photoinitiator system for uniformly curing of the uncured mass V.

Pullers 41 and 43 were constructed of standard pneumatic automotive tires (13 inch) mounted upon automotive rims connected to an automotive drive shaft (not shown) powered by electric motor (not shown). Tires 41 and 43 were positioned about 14 feet from exiting orifice 15 of die 10 at an interfacial contacting relationship. The tires 41 and 43 were inflated to 35 psi and operated in opposing rotational directions so as to continuously pull the cured rod P exiting from die orifice 15. Pullers 41 and 43 were operated at a wheel speed of 5 feet/minute. The exiting product P was maintained under a compressive force of the inflated tire pressure of 35 psi of the pullers 41 and 43.

Glass mats G (NICO FIBERS having a density 14.52 gms/square foot, sold and distributed by NICO FIBERS, Inc., Shawnee, Ohio 43782) were continuously unwound from glass mat rollers 21 and passed through resin baths 23 for impregnation with uncured resin. Simultaneously, glass rovings R (fiberglass product number 2011, PPG Industries, Inc., Route 4, Shelby, N.C. 28150) were continuously drawn through resin bath 17 and guides 19 and combined with the impregnated mat at mat forming shields 25. The uncured impregnated mat and roving composite V was then fed continuously to die 10.

A vinyl ester resin (HETRON 922 manufactured and distributed by Ashland Chemical Company, Box 2219, Columbus, Ohio 43216) containing about 1.75% by weight UV initiator (sold and distributed as IRGACURE 651 by Ciba-Geigy, 7 Skyline Drive, Hawthorne, N.Y. 10532) was placed in baths 17 and 23 and used as the UV curable resin to impregnate mats G and glass roving R. The curable resin from baths 17 and 23 was impregnated onto the glass mat M and glass roving R at approximately a 40:60 resin to glass weight ratio. The glass mat G comprised about 18% by weight of the total glass mat G and glass rovings R weight. The impregnated and uncured glass fiber or rovings and mat composite V was admitted to the die chamber 13 at a rate of 5 feet/minute of pullers 41 and 43 and continuously irradiated at the irradiating sites of cable ends 31A and 33A within chamber 11 with the UV light. The UV light generated by the UV source 3 transmitted and discharged at the composite V interface at cable ends 31A, and 33A photoinitiated the UV initiator and the curing of the impregnated uncured composite V to a cured thermoset product P. The pultrusion process ran continuously and smoothly without difficulty or breakdown to produce a uniform end product P. The resultant impregnated product P issuing from die 10 was cross-sectionally cut and examined for uniformity in curing. Examination of the cross-sectional cuts revealed uniform curing of the impregnated resin to the desired a fully cured thermoset resin. The cured product P was substantially free from uncured composite V. There was no evidence of any uncured surface or internal pockets or non-uniformity of curing throughout the entire cross-sectional cut. Unlike high temperature curing, the cured product P was essentially free from any gaseous characteristically voids created by volatilized components within the cured composite or uneven thermal treatment. The cured product P, when subjected to mechanical testing and bending, revealed excellent interfacial bonding and positive transfer between adjacent filaments. The composite P possessed excellent tensile strength and resistance against fracture when subjected to stress. The composites were of a high-density possessing exceptional impact resistance. Upon standing overnight, the cured product P exhibited further characteristics as commonly occurs with thermally cured composite products.

EXAMPLE 2

Example 1 was repeated using the same uncured reactants V and equipment except that the die forming chamber 10 and irradiation assembly as disclosed in FIGS. 5–7 were used to prepare a cured product P of a T-shaped cross-sectional structure measuring ⅛ inch in thickness. The die 10, as depicted by FIGS. 5–7, cross-sectionally measured 2.5" in depth and 3 inches in width and was comprised of three steel plates 10T, 10D and 10E. Top plate 10T of FIGS. 5–7 measured 1" thick, 3" in width and 30" in length. Bottom plates 10D and 10E measured 1.5" square by 30" in length were provided and threaded bolt receiving apertures (not shown) mating onto the bolt retaining apertures 10P about the peripheral margin of top plate 10T for bolting the top plate 10T and bottom plate 10D and 10E together with head bolts 10H. A channeled groove measuring 1" in width and ¹⁄₁₆" inches in depth was milled lengthwise across the entire bisect of top plate 10T provides the top chambered section and interfacing surface for chamber 11. A mating bottom channeled groove measuring ¹⁄₁₆" in depth and ½" in width was milled from the cornering top edges of bottom plates 10D and 10E as may be observed from FIGS. 6–7 so as to mate onto channeled groove milled from top plate 10T and complete the top chambered section of chamber 11. A recessed, downwardly extending channel was milled from each cornering edge of plates 10D and 10E (measuring 1" cross-sectional width, 1" length and ¹⁄₁₆" in depth) at the perpendicular bisect of channeled groove of top plate 10T to form the pedestal for the T-shaped chamber 11.

The top plate 10T and bottom plates 10D and 10E of die 10 illustrated by FIGS. 5–7 measured 30 inches in length. A fiber optic cable port 15A of a rectangular shape measuring 1" by 1" centered along the longitudinal bisect of top plate 10T at a distance of 9 inches from die inlet 13 was cut from top plate 10T to provide top port 15A for fiber optic cable 31. Side ports 16A and 17 of a rectangular shape also measuring 1" by 1" and bisectly centered onto channeled recess of plates 10D and 10E were cut from bottom plates 10D and 10E to which respectively fiber optic cables 33 and 34 were anchored. Ports 18 and 19 were cut diagonally from the bottom cornered edges of bottom plates 10D and 10E as illustrated in FIG. 7 to provide anchoring ports 18 and 19 for fiber optic cables 37 and 39. As shown by the cross-sectional view of FIG. 7, the terminating ends 37A and 39A were designed to irradiate the underside portion of the T crossbar. Ports 18 and 19 were diagonally cut so as to access the terminating ends 37A and 39A of fiber optic cables 37 and 39. Ports 18 and 19 of a rectangular cut measuring ¾" by 1" in flush alignment with the interfacing surface of chamber 11 measured cross-sectional size were cut 1.5" removed from ports 15, 16 and 17 and at a centering position 10.5 inches removed from die inlet 13. The T-shaped extrudate produced by die 10 of FIGS. 5–7 measured ⅛" thick with a top and pedestal portion of the T, each measuring 1".

The equipment was operated at the same operational speeds and conditions of Example 1. The process ran continuously and smoothly without interruption. Pulling was uniform and even. Surface and sub-surface examination revealed no voids or pockets and substantial uniformity in curing throughout the entire cured product P. Similar to the product P of Example 1, the cured product P of Example 2 exhibited excellent chemical and physical properties.

What is claimed is:

1. A method for manufacturing a cured thermoset composite by pultrusion using ultraviolet light to catalyze a filamentary material impregnated with uncured thermosetting reactants containing ultraviolet light curable reagents while confining the material within a molding die equipped with a reactant feed inlet for admitting the material to the die, a plurality of ultraviolet conducting means for conducting the ultraviolet light through multiple passageways to irradiating sites positioned within the die so as to uniformly irradiate and catalyze the reactants housed within the die to the cured thermoset composite and a discharging orifice for discharging the cured composite from the die, said method comprising:

a) feeding the filamentary material impregnated with the uncured thermosetting reactants to the die;
   b) transmitting ultraviolet light through the multiple passageways with the conducting means to the irradiating sites onto the uncured reactants confined within the die;
   c) catalyzing and curing said reactants to the cured thermoset composite with said ultraviolet light while confining the reactants within said die; and
   d) pulling the cured thermoset composite through said discharging orifice and from the die.

2. The method according to claim 1 wherein the transmitting includes a plurality of fiber optic cables to transmit the ultraviolet light to a plurality of irradiation sites positioned at an interfacing surface relationship to irradiate the uncured reactants fed through said die.

3. The method according to claim 2 wherein the catalyzing and curing of the reactants is conducted at a temperature of less than 100° C.

4. A method for manufacturing a cured thermoset product by pultrusion using actinic radiation to uniformly initiate and catalyze a filamentary material impregnated with uncured thermosetting reactants containing actinic radiation curable reagents so as to provide a cured thermoset product while the reactants are confined under pressure within a chamber of a molding die equipped with a reactant feed inlet for admitting the material to the die, a plurality of passageways connecting to multiple irradiating sites interiorly positioned within the die so as to uniformly irradiate the uncured reactants of the material within the chamber, actinic radiation conducting means for conducting and uniformly distributing the actinic radiation to the irradiating sites so as to thereby catalyze the material impregnated with the uncured reactants to the cured thermoset product and a discharging orifice for discharging the product from the die, said method comprising:

a) continuously feeding the filamentary material impregnated with the uncured thermosetting reactants to the die;
   b) transmitting the actinic radiation by the conducting means to the irradiating sites positioned within the chamber of the die;
   c) catalyzing and curing said material impregnated with the uncured reactants with said actinic radiation while confining the reactants within said die so as to provide the cured thermoset product; and
   d) pulling the cured thermoset product through said discharging orifice and from the die.

5. The method according to claim 4 wherein the actinic radiation consists essentially of ultraviolet light.

6. The method according to claim 5 wherein the transmitting includes the conducting of the ultraviolet light to the irradiating sites with fiber optic cables.

7. The method according to claim 6 wherein two oppositely positioned surface areas of the uncured reactant within the die are subjected to opposingly inwardly irradiation emitted from terminating ends of the fiber optic cables.

8. The method according to claim 7 wherein the chamber of the molding die includes at least two longitudinally extending and connected chambers adapted to form cured products with multiple extending longitudinal planes disposed at a transverse relationship.

9. The method according to claim 8 wherein a surface area amounting to at least 90% of the total surface area of the cured product is subjected to the opposingly irradiation.

10. The method according to claim 5 wherein the catalyzing and the curing is conducted at a temperature of less than 100° C.

11. The method according to claim 10 wherein substantially all of an external surface area of the cured product is subjected to interfacial irradiation at the irradiating sites with the ultraviolet light.

12. The method according to claim 4 wherein the transmitting consists essentially of the irradiating of an interfacing surface area of the uncured reactants with ultraviolet radiation.

13. The method according to claim 12 wherein the irradiating includes the irradiating of substantially all of the interfacing surface area of the uncured reactants with the ultraviolet irradiation.

14. A method for manufacturing a cured thermoset composite by pultrusion using ultraviolet light to catalyze a filamentary material impregnated with uncured thermosetting reactants containing ultraviolet light curable reagents while confining the material within a molding die equipped with a reactant feed inlet for admitting the material to the die, a plurality of fiber optic cables for conducting the ultraviolet light to a plurality of irradiating sites positioned within the die at an interfacing surface relationship with the material so as to uniformly irradiate and catalyze the material impregnated with the uncured reactants to the cured thermoset composite, and a discharging orifice for discharging the cured composite from the die, said method comprising:

a) feeding the filamentary material impregnated with the uncured thermosetting reactants to the die;

b) transmitting ultraviolet light through the plurality of fiber optic cables to the irradiating sites to irradiate the material impregnated with the uncured reactants while confining the material within the die;

c) catalyzing and curing said uncured reactants of the material with ultraviolet light while confining the reactants within said die so as to provide the cured thermoset composite; and d) pulling the cured thermoset composite through said discharging orifice and form the die.

* * * * *